US008166151B2

(12) United States Patent  (10) Patent No.: US 8,166,151 B2
Tsillas  (45) Date of Patent: Apr. 24, 2012

(54) METHOD AND APPARATUS FOR DETERMINING A SPANNING TREE

(75) Inventor: Demetrios James Tsillas, Littleton, MA (US)

(73) Assignee: Enterasys Networks, Inc., Andover, MA (US)

( * ) Notice: Subject to any disclaimer, the term of this patent is extended or adjusted under 35 U.S.C. 154(b) by 1631 days.

(21) Appl. No.: 10/743,554

(22) Filed: Dec. 22, 2003

(65) Prior Publication Data

US 2005/0138008 A1 Jun. 23, 2005

Related U.S. Application Data

(60) Provisional application No. 60/435,492, filed on Dec. 20, 2002.

(51) Int. Cl.
 *G06F 15/16* (2006.01)
(52) U.S. Cl. ......... 709/224; 709/223; 709/226; 709/227
(58) Field of Classification Search .................... 709/224
 See application file for complete search history.

(56) References Cited

U.S. PATENT DOCUMENTS

| | | | | |
|---|---|---|---|---|
| 6,628,624 | B1 * | 9/2003 | Mahajan et al. | 370/256 |
| 6,801,506 | B1 * | 10/2004 | Dey | 370/256 |
| 6,879,594 | B1 * | 4/2005 | Lee et al. | 370/408 |
| 2001/0021177 | A1 * | 9/2001 | Ishii | 370/256 |
| 2003/0037162 | A1 * | 2/2003 | Kotser | 709/236 |
| 2004/0081171 | A1 * | 4/2004 | Finn | 370/395.53 |

OTHER PUBLICATIONS

Perlman, R: "Interconnections: Bridges and Routers" Interconnections: Bridges and Routers, Reading, Addison Wesley, US, 1992, XP002298549 ISBN: 0-201-56332-0, pp. 5.*
Perlman, R: "Interconnections: Bridges and Routers" Interconnections: Bridges and Routers, Reading, Addison Wesley, US, 1992, pp. 107-110, XP002298549 ISBN: 0-201-56332-0.

(Continued)

*Primary Examiner* — Jeffrey Pwu
*Assistant Examiner* — Sulaiman Nooristany
(74) *Attorney, Agent, or Firm* — Lando & Anastasi, LLP (57) ABSTRACT

It is realized that the use of a spanning tree protocol in particular portions of a network may not necessarily be desired due to performance and stability reasons. A method and system is provided for executing a revised spanning tree algorithm that performs more optimally in particular network topologies. In one aspect, a spanning tree protocol is executed over a first and second network connected by a third network, wherein the spanning tree network is disabled in the third network. The third network may be, for example, a core network through which first and second Layer 2 networks are bridged. The first and second networks may be coupled by another network or network connection, and it may be preferable to allow the operation of the spanning tree network between the first and second coupled networks for the purpose of fail over to redundant paths. In network forwarding devices positioned at edges of the core network, the operation of the STP over interfaces where network tunnels of each network forwarding device attached to the core network may be inhibited (e.g., turned off). A phantom root bridge may be created that does not correspond to an actual network forwarding node, and this phantom root bridge may have a bridge identifier which is used by network forwarding nodes as the root bridge. In this manner, STP protocols may work as intended in peripheral networks, while STP does not need to be executed in the core.

17 Claims, 4 Drawing Sheets

OTHER PUBLICATIONS

Murthy S., et al., "A Loop-Free Routing Protocol for Large-Scale Internets Using Distance Vectors" Computer Communications, Elsevier Science Publishers BW, Amsterdam, NL, vol. 21, No. 2, Mar. 1, 1998, pp. 147-161, XP004113241 ISSN: 0140-3664, Abstract p. 152.

Perlman R. Ed—Institute of Electrical and Electronics Engineers: "An Algorithm for Distributed Computation of a Spanning Tree in an Extended LAN" Proceedings of the Data Communications Symposium. Whistler Mountain, British Columbia, Sep. 10-13, 1985, Washington, IEEE Computer Society Press, US, vol. SYMP. 9, 1985, pp. 44-53, XP000619290.

* cited by examiner

METHOD AND APPARATUS FOR DETERMINING A SPANNING TREE

RELATED APPLICATIONS

This application claims priority under 35 U.S.C. §119(e) to U.S. Provisional Application Ser. No. 60/435,492, entitled "PHANTOM ROOT SPANNING TREE ACROSS A FULL MESH CORE," filed on Dec. 20, 2002, which is herein incorporated by reference in its entirety.

BACKGROUND OF THE INVENTION

1. Field of Invention

The field of the invention relates generally to network communication, and more specifically, to networks using a spanning tree algorithm to determine network topology.

2. Discussion of Related Art

Communication networks are generally used to transfer information between computers, referred to in the art as hosts. These hosts may be, for example, general purpose computer systems (e.g., personal computers (PCs), servers, etc.) that communicate data. Generally, a network includes one or more components referred to herein as network forwarding devices that are adapted to receive and forward messages from/to hosts. These network forwarding devices may be in turn coupled to other network forwarding devices in a communication network. Messages sent by hosts (e.g., in the form of data frames, cells, packets, or the like) are received by network forwarding devices and are ultimately forwarded onto a destination host.

Network forwarding devices generally format messages according to one or more network communication protocols, and messages are forwarded according to one or more forwarding protocols. Messages may be, for example, bridged from one network to another according to the IEEE 802.1d standard that defines MAC bridging. The IEEE 802.1d standard also defines a spanning tree protocol that may be used by bridges to eliminate loops in a network.

Loops in a bridged network typically cause problems, such as, for example, messages to be transmitted multiple times over the same interface or cause other communication errors. In general, the spanning tree protocol (STP) allows a distributed network of network forwarding devices (e.g., bridges) to determine a network topology in which loops are eliminated. The ultimate configuration of the network determined by an STP is a tree, with one network path determined as the designed interface to the root bridge. Spanning tree algorithms are well-known in the field of network communication. Spanning tree concepts are discussed with more particularity in the book entitled "Data and Computer Network Communications" by William Stallings, Fourth Edition, 1994, Macmillan Publishing Company, New York, N.Y., herein incorporated by reference by its entirety.

Spanning tree involves communication between one or more network forwarding devices to determine a loop-free topology. The communication determines what is referred to as a root bridge, and determines, at each forwarding device, its minimum path to the root bridge. The bridge having the lowest identifier is chosen to be the root of the spanning tree.

Associated with each port on each network forwarding device is a path cost, which is the cost of transmitting a message (e.g., a frame) onto the network (or other forwarding device) through the respective port. In the simplest case, all path costs can be assigned a value of one (1). Thus the cost of a path in this case is a count of the number of network forwarding devices along the path. Alternatively, costs may be assigned in inverse proportion with respect to data rate, preferred path or corresponding to any other criteria chosen by a network administrator.

Each network forwarding device discovers a first network hop on a minimum-cost path to the root bridge. The port used for that hop is referred to as the root port. For each network forwarding device, the cost of the path to the root bridge with the minimum cost is the root path cost for that network forwarding device.

On each network segment, one network forwarding device is chosen to be the designated bridge. This is the bridge attached to the network segment that provides the minimum cost path to the root bridge. This designated bridge is the only bridge allowed to forward frames to and from the network segment for which the network device is the designated bridge. The port of the designated bridge is the designated port.

In general terms, the spanning tree is constructed in the following manner:

(1) Determine the root bridge
(2) Determine the root port on all other network forwarding devices participating in the spanning tree
(3) Determine the designated port on each network segment, which is the port with the minimum root path cost. In the case of two or more bridges with the same root path cost, then the highest priority bridge is chosen as the designated bridge. If the designated bridge has two or more ports attached to this network segment, then the port having the lowest value of port identifier is chosen.

By this process, when two network segments are directly connected by more than one bridge, all of the bridges but one is eliminated. This process cuts any loops that involve more than one network segment.

The acts above require that network forwarding devices participate in the spanning tree and exchange information. Information is exchanged in the form of bridge protocol data units (BPDUs) as is well-known in the art. A BPDU transmitted by one bridge is addressed and received by all other network forwarding devices connected to the same network segment. Each BPDU includes the following information:

(1) The identifier of the current bridge (the sending bridge) and the port on the bridge
(2) The identifier of the bridge that the current bridge considers to be the root bridge
(3) The root path cost for this bridge To begin the creation of the spanning tree, each bridge considers themselves to each be the root bridge. Each bridge broadcasts a BPDU on each network segment to which the bridge is attached to assert that they are the root bridge. However, on any given network segment, only one bridge will have the lowest-valued bridge identifier. Over time, as BPDUs are propagated, the identity of the one bridge within the spanning tree will be known to all bridges. The root bridge will broadcast the fact that it is the root bridge to all of the network segments to which the root bridge is attached. This allows each of the bridges on those network segments to determine their respective root port and the fact that they are directly connected to the root bridge.

Each of these bridges in turn broadcasts a BPDU on other network segments to which the respective bridge is attached (except for the network segment attached to the root port), indicating that the bridge is one network hop away from the root bridge. This communication propagates root bridge information throughout the bridged network. Each time that a bridge receives a BPDU, the bridge transmits BPDUs on its ports indicating the identity of the root bridge and the number of network hops to reach the root bridge.

Spanning tree protocol (STP) algorithms are used in a variety of network forwarding devices (switches, routers, etc.) where bridging functions are performed. There are a variety of spanning tree algorithms (e.g., rapid STP, multiple STP, etc.) that may be used in a variety of network types and topologies, and with a variety of network communication protocols. For instance, an STP may be used in conjunction with a Multiprotocol Label Switching (MPLS) network to transmit layer 2 (MAC) frames between dispersed networks connected by an MPLS network. MPLS is defined by the IETF as a protocol for transmitting information using tags. Standards have been proposed to use MPLS networks to form Layer 2 Virtual Private Networks (L2VPN). Further, STP algorithms may be used in Virtual Hierarchical LAN Services (VHLS) networks as proposed by Tenor Networks, Inc., Virtual Private LAN Services (VPLS) as proposed by the IETF, or other network topology types. Further, other core-based networks may use one or more STPs.

SUMMARY OF THE INVENTION

According to one aspect of the invention, it is realized that use of spanning tree protocol in particular portions of a network may not necessarily be desired. For instance, in reliable networks where service levels are guaranteed, in network topologies that have a particular amount of redundancy or in network topologies that inherently or otherwise prohibit looping, the execution of spanning tree may not be necessary. For instance, in an MPLS network, the core network may be a reliable network in which executing an STP is not necessary. An MPLS core may be made more reliable, for example, using techniques such as fast-reroute of label-switched paths (LSPs), redundant LSPs, automatic protection switching (APS), or other techniques. In such reliable networks, the execution of an STP may not be necessary. Also, in network types such as circuit-switched networks or other types of networks where loops are not a concern, an STP does not provide much advantage. Further, in networks having a large number of network forwarding devices, it may be beneficial to not to execute a spanning tree protocol (STP) to reduce the amount of communication and overhead necessary to execute STP. Indeed, in a large network, execution of a spanning tree protocol may become unstable. Such large networks may include so-called "Metro Ethernet" bridged networks that use one or more core transport mechanisms to bridge a number of disparate Ethernet LANs in a transparent manner.

For instance, STP may be used in a network that implements the Virtual Hierarchical LAN Services (VHLS) model proposed by Tenor Networks, Inc., whose assets have been acquired by Enterasys Networks, Inc. Such a VHLS model is more fully described in the IETF Internet Draft document entitled "Virtual Hierarchical LAN Services", by Arnold Sodder, October 2002 (Document file draft-sodder-ppvpn-vhls-00.txt), incorporated by reference by its entirety. This document describes an Ethernet L2VPN model that provides point-to-point and point-to-multipoint Layer 2 data communication services using a hierarchical LAN switching architecture. More particularly, by executing an STP through a core network under VHLS results in a root bridge that periodically sends a bridge protocol data unit (BPDU) to each node at an edge of the core network. For N nodes, N BPDUs are transmitted. If a new root bridge is elected, each node sends N BPDUs, creating a communication of $N^2$ BPDUs. In this model, there is a scalability problem for networks having a large number of nodes (N).

Similar problems occur under the Virtual Private LAN Services (VPLS) model proposed by the Internet Engineering Task Force (IETF). Such a model is more fully described in several IETF Internet Draft proposals highlighted in different IETF documents. These documents generally describe a distributed Ethernet LAN architecture that may be connected by an MPLS/IP core network in a transparent fashion as if multiple Ethernet LANs were connected by bridges. In the case of VPLS, by executing an STP in a core network using VPLS results in sending N*M BPDUs in a steady state (i.e., when a root has already been selected), where N is the number of nodes and M is the number of VPNs. If a new root bridge is elected, then $(M*N)^2$ BPDUs are transmitted. This presents scalability issues in networks having a large number of nodes (N) or a large number of VPNs (M).

One aspect of the present invention relates to adapting a spanning tree algorithm to work more optimally in particular network topologies.

According to one aspect of the present invention, the spanning tree protocol is run over a first and second network connected by a third network, wherein the spanning tree network is disabled in the third network. The third network may be, for example, a core network through which first and second layer 2 networks are bridged.

If the first and second networks are coupled (e.g., by another network or network connection), it may be preferable to allow the operation of the spanning tree network between these first and second coupled networks for the purpose of failover to redundant paths. In network forwarding devices positioned at edges of the core network, the operation of the STP over interfaces or network tunnels of each network forwarding device attached to the core network may be inhibited (e.g., turned off). What is referred to as a "phantom" root bridge may be created that does not correspond to an actual network forwarding node, and this phantom root bridge may have a bridge identifier which is used by network forwarding nodes as the root bridge. This root bridge identifier may be, for example, an identifier having a small value such that the spanning tree protocol chooses the phantom root bridge as the actual root bridge used in the spanning tree. For instance, the phantom root bridge value may be set to 00-00-00-00-00-00-00-01 (the lowest possible value) to ensure that the phantom root becomes the root bridge.

Configuration BPDUs issued on access ports of the edge network forwarding devices to the rest of the attached networks may include a root identifier value equal to the bridge identifier of the phantom root bridge. Optionally, each of the edge network forwarding devices may be configured to contain a root path cost of one (1) (e.g., 0x000000001). The actual root path cost value is not important, but rather, it is preferable that each of the advertised root path costs among the edge network forwarding nodes are the same value, to ensure the shortest path from attached networks to the core network. In this manner, the STP protocol may work as intended in peripheral networks, while STP does not need to be executed in the core.

According to one aspect of the present invention, a method is provided for determining a spanning tree. The method comprises acts of determining a root bridge identifier, the root bridge identifier being used as a root bridge identifier in a plurality of network forwarding devices, at least two of which are coupled by a network and participate in a same spanning tree, and using, by the at least two of the plurality of network forwarding devices, the root bridge identifier without having to exchange the root bridge identifier in a network message. According to one embodiment of the present invention, the act of determining the root bridge identifier includes an act of configuring, at the at least two of the network forwarding devices, the root bridge identifier as being the root bridge in the spanning tree.

According to one embodiment of the present invention, the method further comprises an act of configuring, at the at least two of the network forwarding devices, a same root bridge path cost. According to another embodiment of the present invention, the act of determining a root bridge identifier further comprises an act of configuring, in a respective memory of the at least two of the plurality of network forwarding devices, an entry for the root bridge identifier. According to one embodiment of the present invention, the method further comprises an act of determining, for at least one respective access port of the at least two of the plurality of network forwarding devices, a root path cost.

According to another embodiment of the present invention, the root path costs for the at least one respective access port of the at least two of the plurality of network forwarding devices are the same value. According to another embodiment of the present invention, the network includes a bridged network that couples the at least two network forwarding devices, and wherein the method further comprises an act of disabling, on at least one port of the at least two network forwarding devices coupled to the network, transmission of bridge protocol data units (BPDUs) between the at least two network forwarding devices. According to another embodiment of the present invention, the bridged network is implemented using Multiprotocol Label Switching (MPLS).

According to one embodiment of the present invention, the method further comprises an act of transmitting, on at least one respective access port of the at least two of the plurality of network forwarding devices, bridge protocol data units (BPDUs). According to another embodiment of the present invention, the at least two of the plurality of network forwarding devices are coupled by another network, and the method further comprises communicating the root bridge identifier in at least one BPDU transmitted on the another network. According to another embodiment of the present invention, the network includes a bridged network that couples the at least two network forwarding devices, and wherein the method further comprises an act of disabling, on at least one logical connection of the at least two network forwarding devices coupled to the network, transmission of bridge protocol data units (BPDUs) between the at least two network forwarding devices. According to another embodiment of the present invention, the bridged network is implemented using Multiprotocol Label Switching (MPLS).

According to one embodiment of the present invention, the method comprises an act of transmitting, on at least one respective access port of the at least two of the plurality of network forwarding devices, bridge protocol data units (BPDUs). According to another embodiment of the present invention, the at least two of the plurality of network forwarding devices are coupled by another network, and the method further comprises communicating the root bridge identifier in at least one BPDU transmitted on the another network. According to another embodiment of the present invention, the at least two of the plurality of network forwarding devices are located at the edge of a provider network, and wherein the further comprises an act of disabling, on at least one respective port of the at least two network forwarding devices, each of the at least one respective ports being coupled to the provider network, transmission of bridge protocol data units (BPDUs) between the at least two network forwarding devices. According to one embodiment of the present invention, the root bridge identifier is not assigned to any network forwarding device in the spanning tree.

According to another aspect of the present invention, a method for determining a spanning tree is provided. The method comprises acts of conducting a spanning tree protocol (STP) in first and second networks coupled by a third network, the act of conducting comprising an act of transmitting messages between network nodes in accordance with the STP, wherein transmission of messages between nodes in accordance with the STP over a third network is suppressed. According to one aspect of the present invention, a system for forwarding data in a communication network, is provided. The system being capable of participating in a spanning tree, the spanning tree including a plurality of network forwarding systems, the system comprises a memory, a plurality of network interfaces, at least one of which is coupled to another network forwarding system through a plurality of networks, the another network forwarding system participating in the spanning tree, a control adapted to disable transmission of spanning tree messages over at least one of the plurality of networks coupling the system and the another network forwarding system, and a control adapted to configure, in the memory, an identifier of a root bridge for use in the spanning tree, wherein the identifier is not assigned to any network forwarding system participating in the spanning tree.

According to one embodiment of the present invention, the system comprises a control adapted to configure, in the memory, a root path cost value transmitted in the spanning tree messages, the spanning tree messages being transmitted over other ones of the plurality of networks except the at least one of the plurality of networks. According to another embodiment of the present invention, a value of the identifier of the root bridge is configured to be the same value among the system and another network forwarding system. According to one embodiment of the present invention, the control adapted to disable transmission of the spanning tree over at least one of the plurality of networks further comprises a control adapted to disable transmission of the spanning tree messages over at least one of the plurality of network interfaces.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears. All references cited herein are expressly incorporated by reference.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
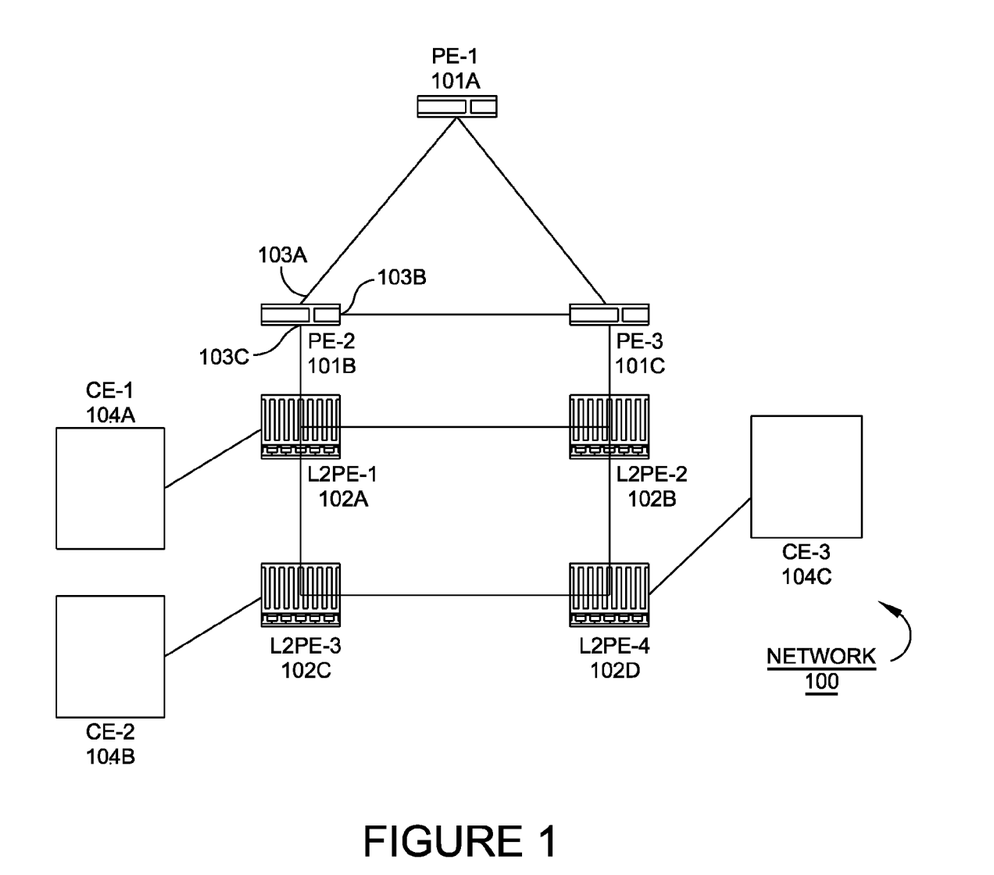
FIG. 1 shows a block diagram of a network in which various aspects of the present invention may be practiced.

FIG. 1 shows a block diagram of a network in which various aspects of the present invention may be practiced. A network 100 includes a number of network forwarding nodes or systems 101A-101C and 102A-102D for communicating data between hosts (not shown) that are coupled to network 100 through one or more network forwarding nodes (e.g. nodes 102A-102D).

According to one embodiment of the invention, a spanning tree protocol may be adapted to work more optimally in particular network topologies.

In the topology shown in FIG. 1, there are a number of provider edge (PE) devices that communicate over a core network connecting the nodes. For example, as shown in network 100, a provider edge system PE-1 (Item 101A) is coupled to provider edge devices PE-2 (Item 101B) and PE-3 (Item 101C). For example, PE devices may be coupled by a network implementing Multiprotocol Label Switching (MPLS) that transmits Layer 2 MAC frames between networks.

One or more Layer 2 provider edge forwarding devices (e.g., switches) may be coupled to one or more of the provider edge nodes through one or more links. In one embodiment, these Layer 2 provider edge systems communicate to provider edge systems an encapsulated Internet format (e.g., hierarchical encapsulated Internet) and communicate to one or more customer edge (CE) devices using the Internet protocol.

For example, as shown in FIG. 1, Layer 2 provider edge device L2PE-1 (Item 102A) is coupled to provider edge device PE-2 (Item 101B). Layer 2 provider edge device L2PE-1 is also coupled to a customer edge device CE-1 (Item 104A) and may also be coupled to another Layer 2 provider edge switch (e.g., L2PE-3 (Item 102C), L2PE-2 (Item 102B), etc.) One or more hosts (not shown) may be attached to network 101 at any number of points including at a network associated with customer edge (CE) devices or Layer 2 provided edge devices.

Each of these network forwarding devices include one or more interfaces for receiving and transmitting data. These devices may communicate in one or more different protocols and may communicate information using a variety of data formats. For instance, PE-2 (Item 101B) may include an interface 103A which communicates using one or more tunnels configured between provider edge devices. According to one aspect, provider edge devices may be configured in an MPLS VPN core. Further, PE devices may be configured in a full mesh configuration where each PE device includes a connection to all other PE devices in the core.

Provider edge devices may also include connections to one or more provider edge devices. In the case of provider edge device PE-2, device PE-2 may be coupled to PE-1 through any interface 103A and may be coupled to provider edge device PE-3 through interface 103B. Provider edge device PE-2 may also include a connection to one or more Layer 2 provider edge devices. These Layer 2 provider edge devices may be further connected to other Layer 2 provider edge devices or customer edge devices or hosts.

It should be appreciated that various aspects of the invention may be used in any bridged network, and network 100 is merely an example of a network in which various aspects of the invention may be used. More particularly, network 101 may have other connections or configurations, use other protocols in the core (e.g., TCP/IP, MPLS, etc.) or have any number of provider edge, Layer 2 provider edge or customer edge devices.

According to one aspect of the invention, the spanning tree protocol is executed by PE devices on access ports attached to L2PE devices, but spanning tree protocols are disabled on connections to the core network (e.g., an interface coupled to other PE devices through the core). For instance, the transmission of bridge protocol data units (PDUs) are suppressed on interfaces of PE devices connected to the core. Because the transmission of the PDUs is suppressed in the core, and therefore, the spanning tree protocol is not run in the core.

As discussed above, by not running an STP through the core, amount of overhead and message number of messages being sent between provider edge (PE) devices is reduced. Further, in networks having a large number of provider edge devices, it may be beneficial not to run the spanning tree for a large number of nodes. According to one embodiment of the invention, the STP protocol is not run on MPLS ports or tunnels of provider edge (PE) devices.

According to one embodiment of the invention, the spanning tree protocol executed on provider edge devices operates according to IEEE standard specified behavior subject to the following modifications:

1. The Configuration BPDUs issued on the access ports contain a root identifier equal to some small network-wide value (e.g., 00-00-00-00-00-00-00-01).
2. The Configuration BPDUs issued on the access ports contain a Root Path Cost equal to 0x000000001.
3. When a PE receives a Topology Change Notification, it responds by setting the Topology Change Acknowledge Flag and by setting the Topology Change Flag on its BPDUs.

These changes allow an STP to eliminate forwarding loops and to allow for redundant paths while running an STP at the edge of a network. When STP is not run through an MPLS core network, for example, scalability issues as discussed above may be avoided.

It is desirable for the MPLS core to be reliable, as L2PE devices typically assume that the phantom root bridge is reachable through the core network. The core network may be reliable using techniques, for example, such as fast-reroute of label-switched hats (LSPs), redundant LPSs, automatic protection switching (APS), etc.

Figure 2:
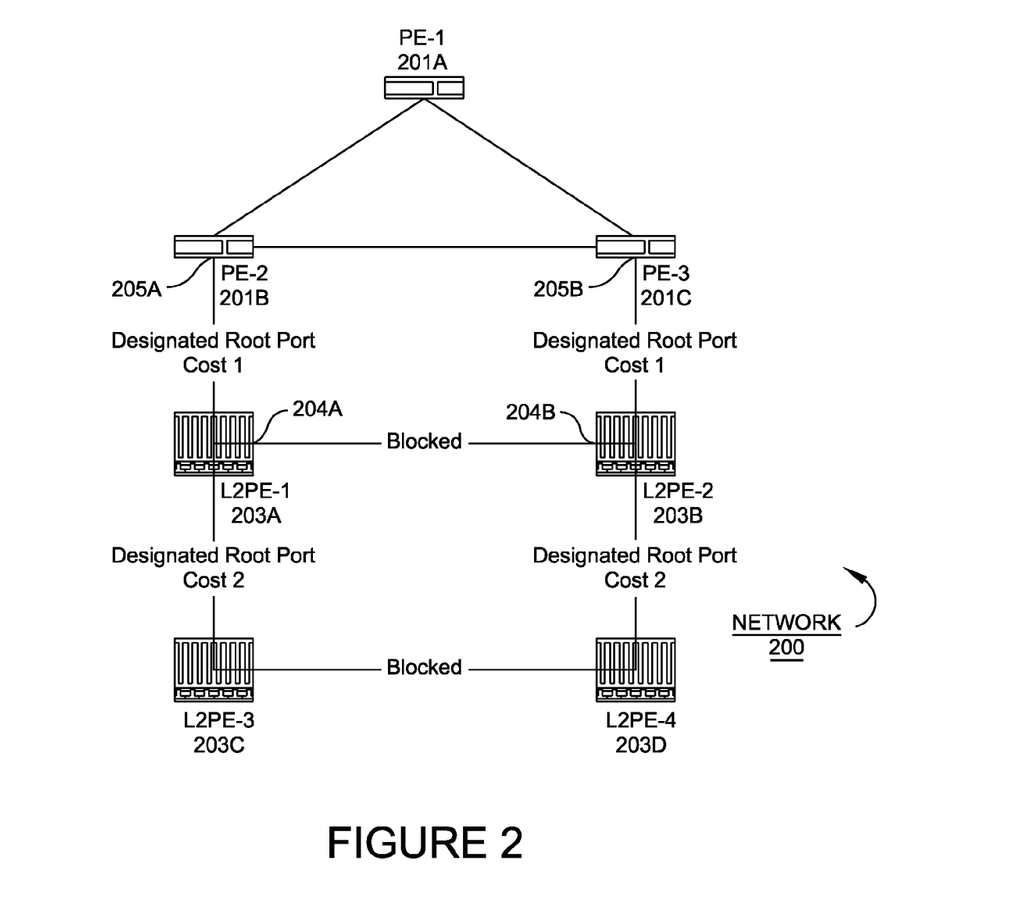
FIG. 2 shows a block diagram of a network in which a spanning tree is implemented according to one embodiment of the present invention.

FIG. 2 shows a block diagram of a network in which a spanning tree is implemented according to one embodiment of the present invention. More particularly, FIG. 2 shows a network 200 that includes similar elements to those described with reference to about to FIG. 1, but the operation of the spanning tree protocol as implemented by provider edge (PE) devices is modified as discussed above. More particularly, the spanning tree is suppressed in the core network connecting provider edge devices 201A-201C. In the network shown in FIG. 2, there are four (4) L2PE nodes interconnected and attached to PE nodes at two network connection points. Nodes PE-2 and PE-3 runs STP on ports facing L2PE-1 and L2PE-2, respectively. In one example, BPDUs sent on these ports (from the PE devices) have a root path cost of one.

Layer 2 provider edge devices L2PE-1 through L2PE-4 (Items 203A-203D) run STP on all of their ports. When an L2PE receives BPDUs from PE-2 and PE-3, respectively, the L2PE devices set their designated root ports to be the ports that are coupled to the PEs, as these ports have the lowest root path cost. The L2PE devices at their configured port costs and send BPDUs on their L2PE facing ports.

Loops are eliminated because ports between L2PEs enter the blocking state when a configuration BPDU is received with a root path cost greater than the cost to the provider edge systems. For example, when L2PE-2 receives a root path cost of two from L2PE-1 (assuming the configured cost is one on L2PE-1's port), L2PE-2 blocks forwarding because the port connecting the L2PE-1 and L2PE-2 is not the designated root port (because the cost is greater over this interface, and the root identifiers are the same value.

As shown in the example in FIG. 2, if the port costs are configured to have a value of one on all ports of devices in network 200, then the shown forwarding topology is a result after the exchange of configuration BPDUs. That is, the spanning tree cascades away from the core network with redundant connections between L2PEs placed in a blocking state.

Figure 3:
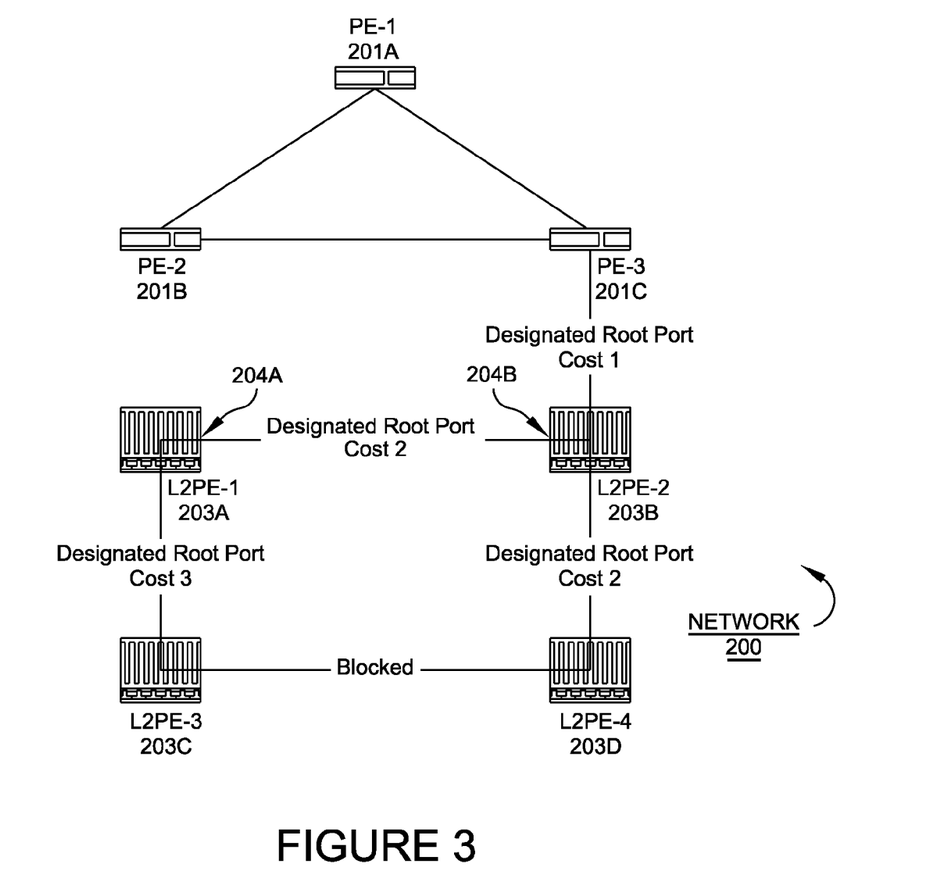
FIG. 3 shows a block diagram of a network having a link failure and a reconfiguration of the spanning tree according to one embodiment of the present invention.

FIG. 3 shows a block diagram of the network having a link failure and reconfiguration of the spanning tree according to one embodiment of the present invention. In particular, FIG. 3 shows a subsequent link failure between PE-2 and L2PE-1, L2PE-1 detects this change and selects a new designated root port. If L2PE-1 was blocking the port to L2PE-2, L2PE-1 now allows the port to enter the forwarding state and send a new configuration BPDU to L2PE-3 with a root metric cost of three. In this manner, data received by L2PE-1 is forwarded over interface 204A to interface 204B of L2PE-2. Therefore, according to one aspect of the invention, the spanning tree is suppressed in the core while spanning tree is executed among a number of periphery networks that are connected for failover considerations.

IEEE 802.1d defines the root bridge as the node at which the bridge identifier is equal to the root identifier, however, with a phantom root scheme, there is no such node in the network. Rather, the root bridge identifier does not correspond to an actual node participating in the spanning tree.

Using a phantom root avoids having to run STP on a reliable MPLS core. In this situation, there is no real root on the network, but rather the PEs pretend to have the least cost path to the root. The result is that the PE ports become the designated root ports for the L2PEs and loops among PEs and L2PEs are eliminated using spanning tree. Phantom roots may presume that the MPLS core is loop-free and reliable, because a topology change within the core will not be communicated to the L2PEs. There is aspects of the present invention may be used with network forwarding devices (e.g., bridges, switches, routers, etc.) that implement IEEE 802.1d rapid STP, or multiple STP.

Figure 4:
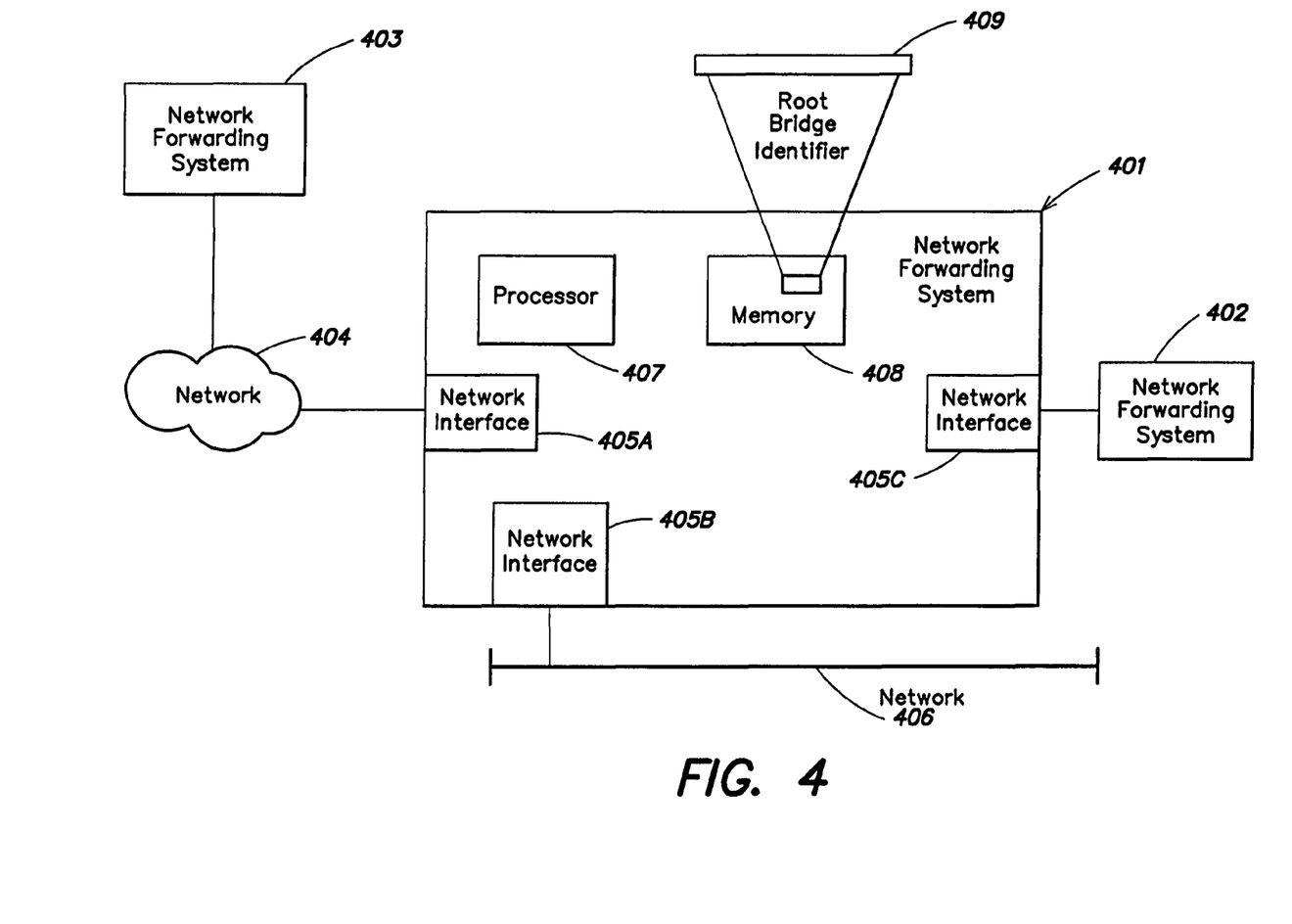
FIG. 4 shows a block diagram of a network forwarding system according to one embodiment of the present invention.

As discussed above, network forwarding devices that function as PE systems may be adapted to execute a revised spanning tree protocol according to one embodiment of the invention. FIG. 4 shows a block diagram of such a network forwarding system according to one embodiment of the present invention. More particularly, a network forwarding system 401 includes a processor 407, memory 408 and a number of network interfaces 405A-405C. Such interfaces 405A-405C may be connected to one or more networks 406, 404 or network forwarding systems (e.g., system 402). As discussed above, network forwarding system 401 may be coupled to one or more network forwarding systems (e.g., system 403) through a core network 404. As discussed above, network 404 may be, for example, an MPLS or other type of network.

According to one embodiment of the invention, network forwarding system 401 includes a memory 408 for storing configuration parameters associated with the system. Memory 408 may be a core system memory or a collection of memory elements associated with one or more network interfaces 405A-405C. In one embodiment, the network forwarding system 401 includes a configuration interface (not shown) that includes a control that allows an administrator to configure operating parameters of system 401. This interface may be, for example, a web-based configuration tool, a network management system interface, command line interface or other interface type for configuring and operating system 401. Such a control interface may accept, from a user, a value of a root bridge identifier 409 to be stored by system 401 in memory 408. This root bridge identifier 409 may be used system 401 as the root bridge for use in a spanning tree. In one embodiment, the root bridge identified 409 does not correspond to any network forwarding device that participates in the spanning tree.

As discussed above, network forwarding system 401 may be configured as a PE device that attaches to a core network 404 in one or more other network forwarding systems. According to another embodiment, network forwarding system 401 may have the capability of disabling spanning tree on interfaces attached to the core. More particularly, networking forwarding system 401 may include a control that allows a disabling of spanning tree on an interface attached to the core. That is, the control disables transmission of spanning tree messages over an interface (e.g., network interface 405A) attached to core network 404.

Network forwarding system 401 may also include a control that allows a network administrator to configure the root path cost associated with spanning tree messages sent to other network interfaces (e.g., network interfaces 405B-405C). In one aspect of the invention, the root bridge cost is the same value used by other network forwarding systems that are attached as PE devices to the core.

As discussed above, a root bridge identifier 409 may be assigned by an administrator and stored in memory 408. This root bridge identified 409 may be, for example, a small value that ensures that this bridge identifier will be selected as the root bridge within the spanning tree. In another embodiment, other network forwarding systems that attach to core 404 include the ability to assign a root bridge identifier 409 in the same manner.

Other network forwarding systems that connect to the core network may also be adapted to execute a modified spanning tree protocol as discussed above with reference to system 401. Thus, a network core may be constructed wherein spanning tree does not communicate updates due to changes in the core.

This invention is not limited in its application to the details of construction and the arrangement of components set forth in the above description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for determining a spanning tree, the method comprising acts of:
   determining a root bridge identifier, the root bridge identifier being used as a root bridge identifier in a plurality of network forwarding devices, the plurality of network forwarding devices including a first network forwarding device and a second network forwarding device participating in a network the first network forwarding device including at least one first port not running spanning tree protocol, the second network forwarding device including at least one second port not running the spanning tree protocol, the first network forwarding device coupled to the second network forwarding device through a core network via the at least one first port and the at least one second port;

storing, by the first network forwarding device and the second network forwarding device, the root bridge identifier without exchanging the root bridge identifier in a spanning tree protocol message; and using, by the first network forwarding device and the second network forwarding device, the root bridge identifier before and after reconfiguration of the spanning tree, wherein the first network forwarding device exchanges data packets with the second network forwarding device through the core network via the at least one first port and the at least one second port before and after the reconfiguration of the spanning tree.

2. The method according to claim 1, wherein the act of determining the root bridge identifier includes an act of configuring, at the first network forwarding device and the second network forwarding device, the root bridge identifier as being the root bridge in the spanning tree.

3. The method according to claim 1, further comprising an act of configuring, at the first network forwarding device and the second network forwarding device, a same root bridge path cost.

4. The method according to claim 1, wherein the act of determining a root bridge identifier further comprises an act of configuring, in a first respective memory of the first network forwarding device and a second respective memory of the second network forwarding device, an entry for the root bridge identifier.

5. The method according to claim 1, further comprising an act of determining, for at least one first respective access port of the first network forwarding device and at least one second respective access port of the second network forwarding device, a root path cost.

6. The method according to claim 5, wherein the root path costs for the at least one first respective access port and the at least one second respective access port are the same value.

7. The method according to claim 5, wherein the core network includes a bridged network that couples the first network forwarding device to the second network forwarding device, and wherein the method further comprises an act of disabling, on the at least one first port and the at least one second port, transmission of bridge protocol data units (BPDUs) between the first network forwarding device and the second network forwarding device.

8. The method according to claim 7, wherein the bridged network is implemented using Multiprotocol Label Switching (MPLS).

9. The method according to claim 7, further comprising an act of transmitting, on the at least one first respective access port and the at least one second respective access port, bridge protocol data units (BPDUs).

10. The method according to claim 9, wherein the first network forwarding device and the second network forwarding device are coupled by another network, and the method further comprises communicating the root bridge identifier in at least one BPDU transmitted on the another network.

11. The method according to claim 5, wherein the core network includes a bridged network that couples the first network forwarding device to the second network forwarding device, and wherein the method further comprises an act of disabling, on at least one first logical connection of the first network forwarding device coupled to the bridged network and at least one second logical connection of the second network forwarding device coupled to the bridged network, transmission of bridge protocol data units (BPDUs) between the first network forwarding device and the second network forwarding device.

12. The method according to claim 11, wherein the bridged network is implemented using Multiprotocol Label Switching (MPLS).

13. The method according to claim 11, further comprising an act of transmitting, on at least one first respective access port of the first network forwarding device and at least one second respective access port of the second network forwarding device, bridge protocol data units (BPDUs).

14. The method according to claim 13, wherein the first network forwarding device and the second network forwarding device are coupled by another network, and the method further comprises communicating the root bridge identifier in at least one BPDU transmitted on the another network.

15. The method according to claim 1, wherein the first network forwarding device and the second network forwarding device are located at the edge of a provider network, and wherein the method further comprises an act of disabling, on at least one first respective port of the first network forwarding device and on at least one second respective port of the second network forwarding device, each of the first and second respective ports being coupled to the provider network, transmission of bridge protocol data units (BPDUs) between the first network forwarding device and the second network forwarding device.

16. The method according to claim 1, wherein the root bridge identifier is not assigned to any network forwarding device in the spanning tree.

17. The method according to claim 1, further comprising:
receiving, by the first network forwarding device, a first Topology Change Notification (TCN);
setting, responsive to receiving the first TCN, a first Topology Change (TC) Flag within a first bridge protocol data unit (BPDU);
transmitting, by the first network forwarding device, the first BPDU;
receiving, by the second network forwarding device, a second TCN;
setting, responsive to receiving the second TCN, a second TC Flag within a second BPDU; and
transmitting, by the second network forwarding device, the second BPDU.

* * * * *